May 25, 1954   R. C. BITTING, JR   2,679,187
SYNCHRONIZATION OF SEPARATE PICTURE AND SOUND FILMS
Filed Jan. 16, 1951   2 Sheets-Sheet 1

INVENTOR.
Robert C. Bitting, Jr.
BY
ATTORNEY.

Patented May 25, 1954

2,679,187

UNITED STATES PATENT OFFICE 2,679,187

SYNCHRONIZATION OF SEPARATE PICTURE AND SOUND FILMS

Robert C. Bitting, Jr., Pennsauken, N. J., assignor to Radio Corporation of America, a corporation of Delaware Application January 16, 1951, Serial No. 206,259

10 Claims. (Cl. 88—16.2)

This invention relates to motion picture equipment, and particularly to the synchronizing of a separate sound record film or tape with its concomitant picture film.

In the production of commercial and professional motion pictures, the sound track is usually recorded on one film and the photographic picture on another film. This is desirable from the editing standpoint. These films are of the perforated type driven by sprockets, which, in turn, are driven by synchronous or self-synchronous motor systems. Therefore, the two films are advanced at the same uniform speed so that they can be easily combined after editing in the final printing process to provide a composite print for reproduction. They may also be advanced as separate films in synchronous or self-synchronous motor systems.

The present invention is directed to a system for amateur use, which will permit the sound to be recorded photographically or on the more convenient and economical magnetic tape systems recently developed. By having the sound film separate from the picture film, editing is facilitated. The present invention accomplishes synchronization when the films are advanced separately without synchronous or self-synchronous motor systems, regardless of whether or not the recording of the sound is made at the time the picture is photographed or the sound is post recorded in the form of narration.

The system utilizes the standard economical spring or electrical motor drive systems of commercial amateur cameras and projectors, the controlling electrical current being obtained with substantially no modification to a camera or projector. This controlling current is obtained from a vibration pickup attached to the camera during photographing and recording, and to the projector during exhibition, the current being utilized in any well-known manner to control the driving motor of the projector.

The principal object of the invention, therefore, is to facilitate the synchronizing of separate picture and sound records.

Another object of the invention is to provide an economical system of synchronizing a picture film with its concomitant sound record.

A further object of the invention is to provide a synchronized picture film and sound record system when separate films are employed.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
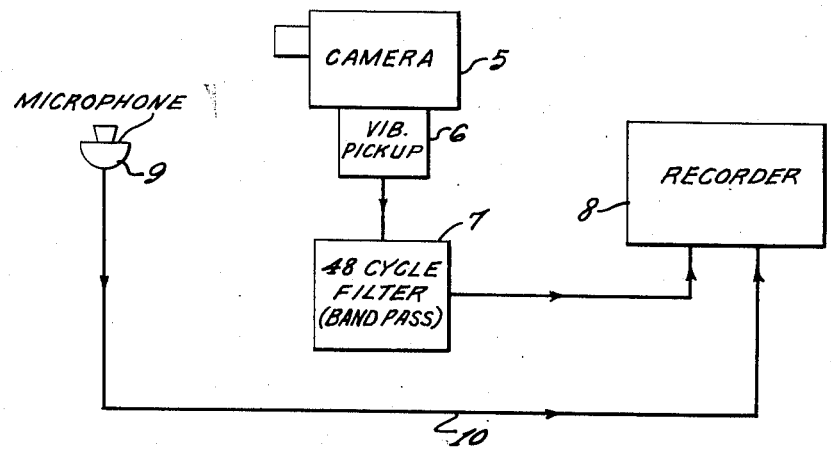
Fig. 1 is a block diagram illustrating the recording system.

Referring to Fig. 1, a picture camera 5, of any standard commercial or amateur type, has attached thereto a vibration pickup 6. The camera may be one which is driven with a spring motor. The pickup may be of any suitable type, such as those used for attachment to musical instruments, and may be either of the crystal or magnetic form. The output of the pickup is fed to a forty-eight cycle filter 7, which may include an amplifier, and then to a recorder 8. The output of a microphone 9 for picking up the sound from the scene being photographed by camera 5 or other source is fed over conductor 10 to the recorder 8 simultaneously with the output of the vibration pickup 6.

The vibration pickup is attached in any suitable way to a camera 5 so that the vibration of the intermittent pull-down mechanism in the camera, operating at sixteen frames per second, will be detected. The detected current will contain this fundamental and the harmonics thereof. It has been found that the forty-eight cycle harmonic is preferable to the fundamental, although any harmonic of sufficient amplitude may be used. The forty-eight cycle harmonic is sufficiently high in frequency to avoid serious amplifier inter-stage coupling problems, yet not too high to preclude easy separation from the sound by electrical filters. The recorder 8 may be either photographic or one of the magnetic type, a very economical form of the latter using a ribbon on which two magnetic tracks are recordable. Thus, one of the two tracks may obtain a signal from the microphone 9, and the other track the forty-eight cycle harmonic from the vibration pickup 6. Both signals, however, may be recorded in the same track.

Figure 2:
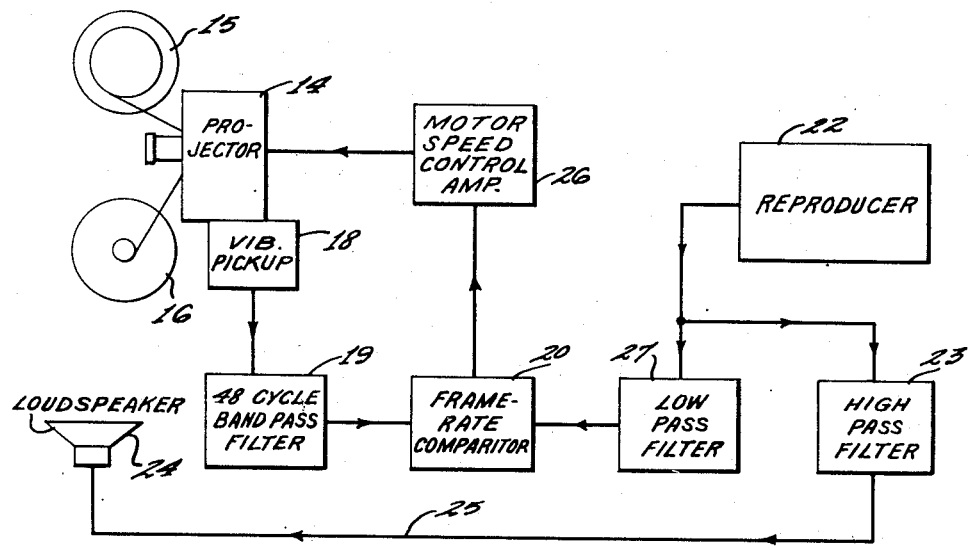
Fig. 2 is a block diagram illustrating the reproducing system.

Referring now to Fig. 2, in which the reproducing system is shown, a motor driven projector 14 with its supply reel 15 and take-up reel 16 has attached thereto a vibration pickup 18 similar to the pickup 6 of Fig. 1. The output of the vibration pickup is again fed to a forty-eight cycle band-pass filter 19, then to a frame rate or phase comparator 20. The sound reproducer 22 will reproduce the signal track, and the recorded vibration pickup track simultaneously. When both signals are in the same track, the reproduced track will be passed through a high-pass filter 23 to eliminate any forty-eight cycle vibration tone, and then is fed to a loudspeaker 24 over conductor 25. The vibration pickup tone will be impressed on a low-pass filter 27, and then on the frame rate comparator 20. The output of the frame rate comparator is impressed on a motor speed control amplifier 26, which is connected to the motor of the projector 14 for advancing the picture film at the same rate of speed as it or its negative is advanced through the camera 5. That is, any change in the camera speed during photographing will be "remembered" by the sound film and corresponding changes made in the projected film. Thus, no change is required in a photographing camera or projector, except for the attachment of the respective vibration pickups 6 and 18 and a wire connection to the projector motor.

Figure 3:
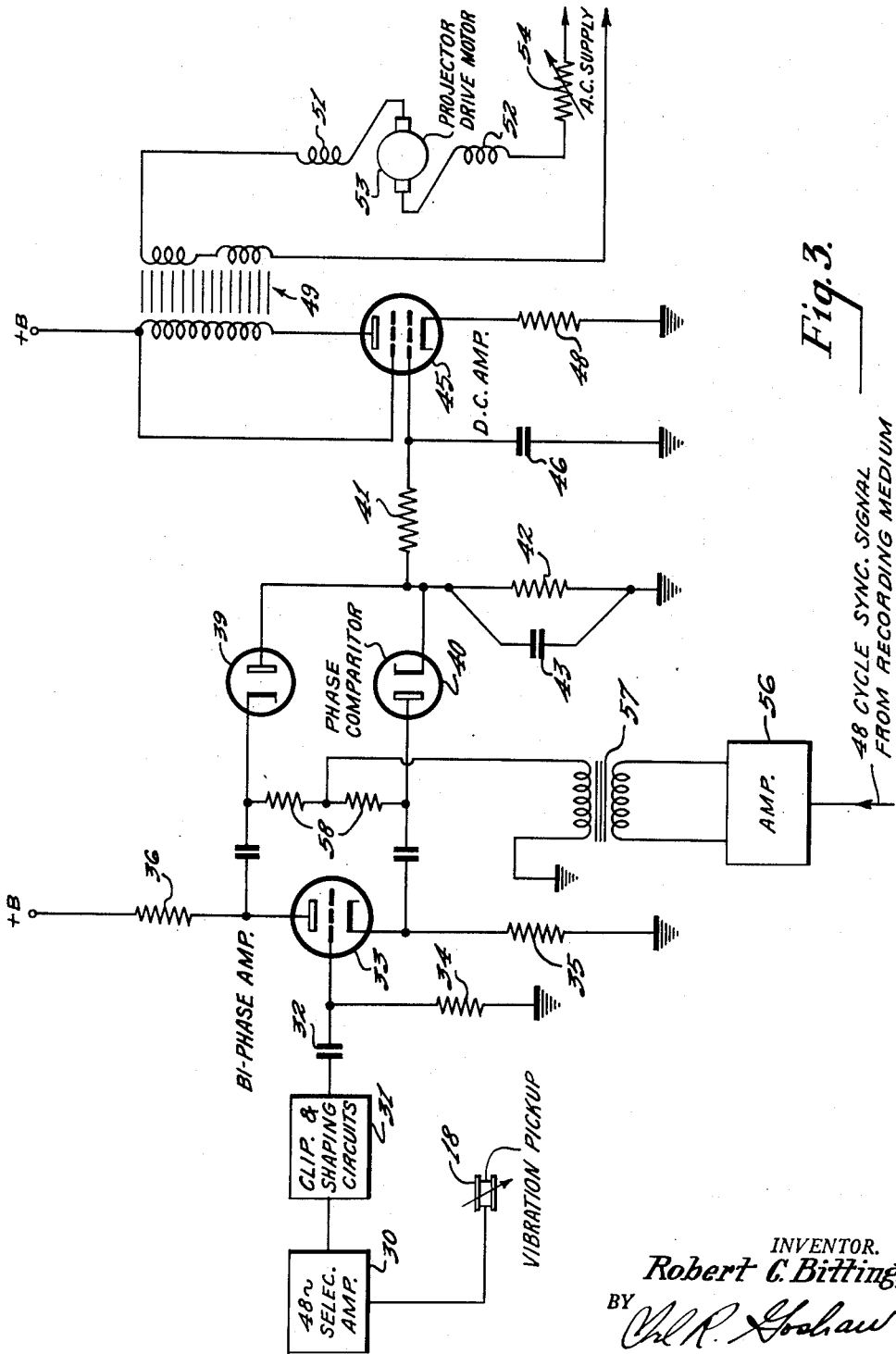
Fig. 3 is a schematic circuit diagram of the reproducing system.

The details of the circuit for the reproducer are shown in Fig. 3, wherein the pickup 18 is shown connected to a forty-eight cycle filter shown in combination with an amplifier 30. To improve the waveform of the forty-eight cycle tone, a standard clipping and shaping circuit unit 31 is employed, which is connected over condenser 32 to a bi-phase amplifier 33 having a grid resistor 34, a cathode bias resistor 35, and a load resistor 36. The output of the amplifier 33 is connected in phase opposition to a frame rate or phase comparator made up of of rectifier tubes 39 and 40, which, in turn, are connected over a series resistor 41 and shunt resistor 42, bi-passed by condenser 43, to a direct current amplifier 45, having a bi-pass condenser 46. The direct current amplifier has a resistor 48, the output of the amplifier being fed through a saturable reactor 49, the secondary of which is in series with the field coils 51 and 52 and armature 53 of the projector drive motor. Also in series with the circuit just mentioned is a variable resistor 54 for controlling the alternating current supply fed to the motor.

The signal from the reproducer is impressed on an amplifier 56 and then over a transformer 57 to the mid point between a pair of resistors 58. Thus, the signal from the vibration pickup 18 is impressed on the comparator in phase opposition, and the forty-eight cycle control tone is impressed on the phase comparator as a longitudinal current. The variation in phase output, therefore, will control the current to the projector drive motor and maintain the speed of the picture film through projector 14 the same as the original speed of the picture film through the camera. That is, changes in speed of the camera 5 with respect to the recorder 8 will be recorded at the time the signal is recorded, and when the signal is reproduced, the projector motor will be maintained at the speed of the camera, regardless of whether or not speed variations occurred in the camera during the photographing of the picture and recording of the sound. Since it is only necessary to make the attachment of the vibration pickup to the camera at the time of photographing and to the projector at the time of projection, the invention is applicable to standard spring or electrically motored amateur cameras and electrically motored projectors now in use to provide synchronization between pictures and their sound accompaniment.

Although the invention has been described with circuit elements for recording both the forty-eight cycles and the concomitant sound in the same track and then separating the currents by filters, the two track system mentioned above may be used which will eliminate the filters.

I claim:

1. A system for synchronizing a projected picture film with a sound track on a separate film comprising means for reproducing said sound track concomitant with said picture film, electrical signal generating means for reproducing a control signal track simultaneously with said sound track, means mechanically attached to said projector for detecting mechanical vibrations in said projector which vary in accordance with the speed of travel of said picture film through said projector and generating electrical signals in accordance with said vibrations, means for comparing the frequency of the electrical signals from the reproduced control track with the frequency of said electrical signals generated from the vibrations of said projector, said comparing means producing a resultant electrical signal which varies proportionally with the phase difference between said electrical signals, a motor for driving said projector, and means for controlling the speed of said motor in accordance with the variations of said resultant electrical signal.

2. A system in accordance with claim 1, in which the frequency of the control signals on said control track is in harmonic of the frequency of the pull-down mechanism vibrations of the camera which photographed said picture, and the frequency of said detected vibration signal is the frequency of the pull-down mechanism vibrations projecting said picture.

3. A system in accordance with claim 1, in which said comparing means includes a phase comparator, a filter clipping and shaping circuit between said comparator and said vibration detecting means, and a filter between said comparator and said means for reproducing said control signal track.

4. In a motion picture system having a camera, a sound recorder for recording concomitant sound for pictures taken by said camera, a projector for said picture, and a sound reproducer for said recorded sound; means for reproducing said recorded sound in true synchronism with the projection of said pictures comprising a vibration pickup mechanism adapted to be mechanically attached to a camera at a point where vibrations are produced by said camera at a frequency which varies in accordance with the speed of the film passing through said camera, said vibration pickup mechanism generating electrical signal pulses from said vibrations, means connecting said vibration pickup mechanism and said sound recorder for recording said electrical signal pulses simultaneously with the recording of said sound, means for attaching said vibration pickup mechanism to a projector at a point where vibrations are produced by said projector at a frequency which varies in accordance with the speed of the film passing through said projector, whereby comparative electrical pulses are produced, means reproducing electrical pulses from said recorded pulses, means for comparing the phase of said comparative electrical pulses and said reproduced electrical pulses so that an electrical control signal is produced, and means actuated by said control signal to maintain said reproduced sound and motion picture in synchronism.

5. A system for obtaining synchronism between a projected picture film and a sound film, comprising a camera, means mechanically attached to said camera for detecting mechanical vibrations in said camera which vary in accordance with the speed of the film passing through said camera, said means generating electrical signal pulses from said vibrations, a sound recorder, means connecting said vibration detecting means to said recorder for recording said electrical signal pulses, a projector, a motor for driving said projector, means for mechanically attaching vibration detecting means to said projector so that electrical signal pulses will be produced which vary in accordance with the speed of the film passing through said camera, means coupled to said vibration detecting means and said electrical signal reproducing means for comparing the frequencies of the reproduced electrical pulses recorded from the vibration of said camera with the electrical pulses produced by the vibration of said projector so that an electrical control signal is produced, and means coupled to said comparing means actuated by said electrical control signal to control the speed of the motor.

6. A system for synchronizing the speed of advancement of separate films, comprising a plurality of film advancing mechanisms, a motor means for driving each of said film advancing mechanisms, means attached to each of said film advancing mechanisms for generating an electrical signal produced by the vibrations of said mechanisms and having a frequency determined by the speed of advancement of the film being advanced by each of said mechanisms, said generating means being coupled to means for comparing the frequencies of said signals from one of said motor driven mechanisms with the signals from the other of said motor driven mechanisms and obtaining a resulting electrical signal having an amplitude corresponding to the difference in frequency between said two generated signals, said comparing means being coupled to means for impressing said resulting electrical signal on the other of said motor means for controlling its speed in accordance with the variations in speed of one of said motor means.

7. A system in accordance with claim 6, in which means are provided for recording and reproducing one of said generated electrical signals for comparing with said other generated electrical signals at the time of generation.

8. A system in accordance with claim 6, in which said generating means is a mechanical vibration pickup.

9. A system in accordance with claim 8, in which a camera houses one of said film advancing mechanisms and a projector houses another of said film advancing mechanisms.

10. A system for maintaining synchronism between the speed of advancement of one film and the speed of advancement of another separate film, comprising means for generating an electrical signal having a frequency varying with the variations in speed of advancement of one of said films, means for making a record of said signal, a first motor for advancing one of said films, a second motor for advancing the other of said films, means including a mechanical vibration pickup for generating a current having a frequency varying with the variations in speed of advancement of said last mentioned film, reproducing means for generating electrical signals from said record, means for comparing the frequency of said reproduced recorded signal with said mechanical vibration pickup signal, and means connected to said second motor and said comparing means for altering the speed of said second motor in accordance with variations in the relative frequency of said signals.

References Cited in the file of this patent

UNITED STATES PATENTS

| Number | Name | Date |
| --- | --- | --- |
| 1,728,986 | Stokes | Sept. 24, 1929 |
| 2,074,516 | Ross | Mar. 23, 1937 |
| 2,074,517 | Ross | Mar. 23, 1937 |
| 2,116,314 | Jenkins | May 3, 1938 |
| 2,208,404 | Aalberg | July 26, 1940 |
| 2,308,441 | Dalgleish | Jan. 12, 1943 |
| 2,354,583 | Eddy | July 25, 1944 |

OTHER REFERENCES

Ranger, Journal of Society of Motion Picture and Television Engineers, vol. 54, Issue No. 3, page 328 through 336, published March 1950.